L. SCOFIELD.
Operating the Seeding Mechanism of Corn Planters.
No. 230,666. Patented Aug. 3, 1880.
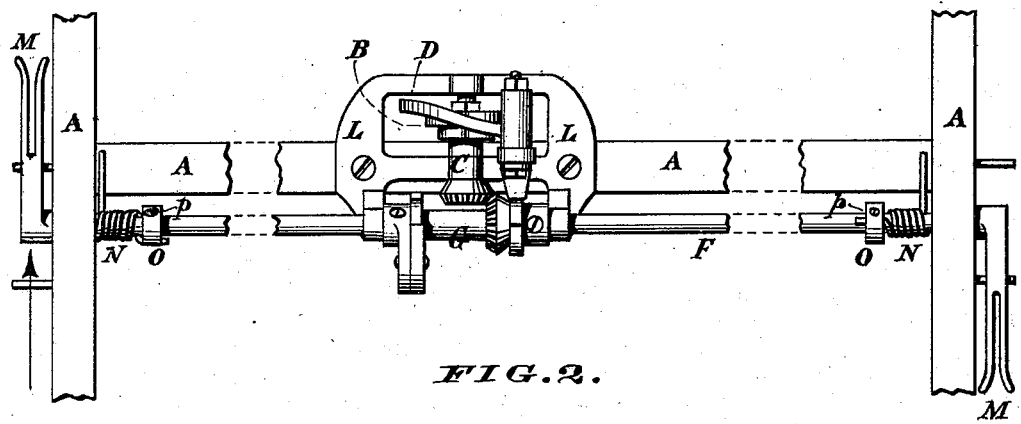
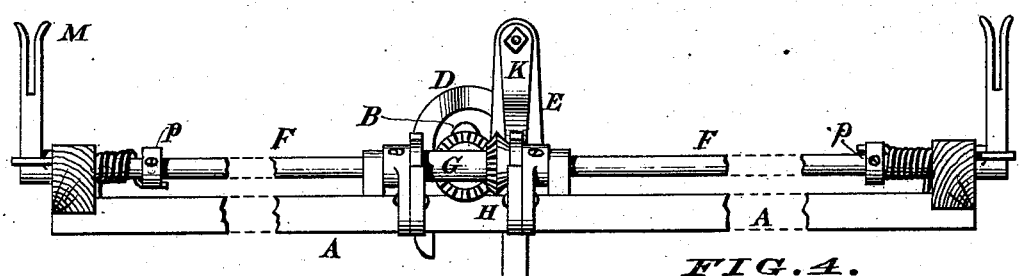
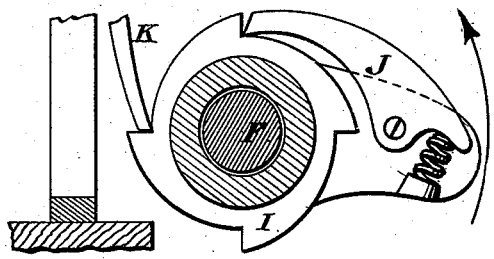
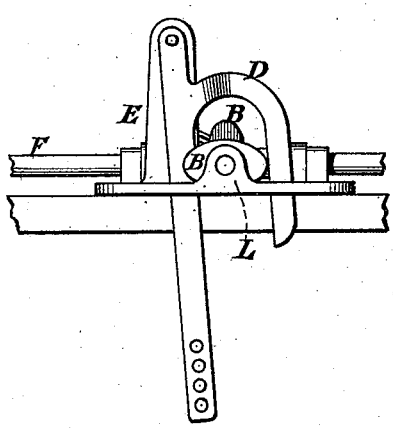
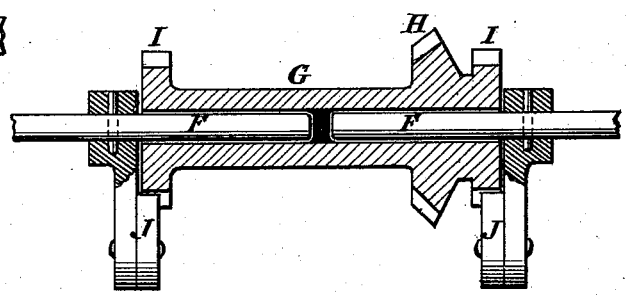
Attest.
Jas. H. Layman.
Inventor.
Levi Scofield
By E. H. Ellsworth
his attorney

UNITED STATES PATENT OFFICE.

LEVI SCOFIELD, OF GRAND HAVEN, MICHIGAN, ASSIGNOR TO DWIGHT CUTLER, OF SAME PLACE, AND JUSTIN B. WAIT, OF BUFFALO COUNTY, NEBRASKA.

OPERATING THE SEEDING MECHANISM OF CORN-PLANTERS.

SPECIFICATION forming part of Letters Patent No. 230,666, dated August 3, 1880.

Application filed December 9, 1879.

*To all whom it may concern:*

Be it known that I, LEVI SCOFIELD, of Grand Haven, in the county of Ottawa and State of Michigan, have invented a new and useful Improvement in Operating the Seeding Mechanism of Corn-Planters; and I do hereby declare the following to be a full, clear, concise, and exact description of the same, sufficient to enable those skilled in the art to make and use it, reference being had to the accompanying drawings, forming part of this specification, wherein—

Figure 1 is a top-plan view of the check-row attachment for corn-planters. Fig. 2 is a side elevation of the same. Fig. 3 is an elevation of the cams and cam-yoke. Fig. 4 is an enlarged transverse sectional view, showing the ratchet-and-pawl connections; and Fig. 5 is a longitudinal sectional view of the loose sleeve on the divided shaft.

Similar letters of reference in the accompanying drawings indicate the same parts.

My invention is designed to improve the means for operating the slide-bar, seed-plates, or seed-valves of a corn-planter; and to this end it consists, principally, in a double cam arranged upon a shaft, to which motion is imparted by independent driving-shafts, and a cam-yoke suspended over and straddling the cams for the purpose of operating the seed-slides or other seeding mechanism with positive and regular movements, as I will now proceed to describe.

The accompanying drawings show the mode of carrying my invention into practice both as to the cam and yoke and the means for operating them to form a check-row attachment. This attachment is secured to the seed-boxes of a corn-planter by any suitable means, so that the long leg of the cam-yoke shall be in position to connect with the slide-bar of the planter.

In the drawings, A may represent the parts of the planter carrying the check-row attachment, or it may represent a separate framework for attachment to the seed-boxes of the planter, either arrangement being practicable.

B B are two double cams set at an angle to each other on the end of a shaft, C, mounted in bearings transversely of the frame A, at or near its center.

D is the cam-yoke, suspended from the side of an upright, E, on the frame A, the two legs of the yoke being in different planes in order to bear against the cams—one against each cam. The yoke is thus hung in a position to vibrate beside the frame, and its long leg extends below the latter to connect with the slide-bar of the planter in any convenient manner.

As shown in the drawings, the leg is provided with a series of perforations, by which the connection with the slide-bar may be adjusted to regulate or change the stroke thereof. The throw of the leg may also be varied by changing the position of the cams on the shaft.

The yoke may be either suspended at the center of its upper end or at one side of the center, both methods serving the same result, although I prefer the latter, as it makes the throw more uniform.

F F represent two independent shafts, having their outer bearings in the end pieces of frame A and their inner bearings in boxes at or near the center of the long bar of frame A, in front of the cam mechanism. A loose sleeve, G, is mounted upon the inner ends of these shafts, and is provided with a miter-wheel, H, gearing with a similar wheel on the cam-shaft, and is also provided with ratchet-wheels I, secured to its extreme ends to receive the action of spring-pawls J, attached to pawl-arms on the two shafts, between their inner bearings and the sleeve. When, therefore, either shaft is oscillated the sleeve is turned by the pawl and ratchet and communicates its motion to the cam-shaft through the miter-wheels.

To prevent the backward rotation of the shafts a spring-stop, K, is attached to the upright E of the cam-yoke, so that its lower end shall engage one of the ratchet-wheels on the sleeve.

For economy and convenience of construction the bearings for the cam-shaft, the inner bearings for the driving-shaft, and the upright for the cam-yoke may all be cast upon or attached to a plate, L, secured to the frame A, as shown in the drawings.

The driving-shafts are operated for check-row planting by means of the knotted rope in general use, working within forked arms M on the outer ends of such shafts. The knots on the rope move the arms in one direction to turn either shaft and throw the yoke, while coiled springs N, connected at one end to the frame A and at the other end to a collar, O, on the shafts, serve to return the arms when the knots have passed through them.

The movements of the arms in each direction may be limited by pins in the frame, or by other suitable means; and it will be understood that when the arms are thrown by the knots on the rope they move from one pin to the other, and then the rope slips off, whereupon the springs throw them back to the other pin, turning the shafts, but not the sleeve, as the latter is held by the spring-stop.

By employing independent shafts the yoke may be operated from either side of the planter, which is a matter of very great convenience in practice.

The collars O are made adjustable on the shafts by means of set-screws $p$, for the purpose of regulating the tension of the springs.

Having thus described my invention, what I claim is—

1. The double cams B B and the suspended cam-yoke D, combined with the cam-shaft C and two independent driving-shafts, F F, substantially as described, for the purpose specified.

2. The sleeve G, held loosely upon the inner ends of the two independent driving-shafts F F, and provided with the miter-gear H, to engage a corresponding gear on the cam-shaft C, and with two ratchet-wheels, I I, to engage the pawls J on the two driving-shafts, substantially as described, for the purpose specified.

3. The combination, in a corn-planter, of the double cams B B, the suspended cam-yoke D, straddling the cams, the geared cam-shaft C, the geared sleeve G, provided with ratchet-wheels I I, and the two independent driving-shafts F F, turning in said sleeve and carrying pawls J, to engage the ratchet-wheels, substantially as described, for the purpose specified.

LEVI SCOFIELD.

Witnesses:
SAMUEL L. TATE,
MARVIN H. CREAYER.